Dec. 26, 1961  T. W. KENYON  3,014,376
GYRO VERTICAL CONSTRUCTIONS
Filed Sept. 23, 1954  7 Sheets-Sheet 1
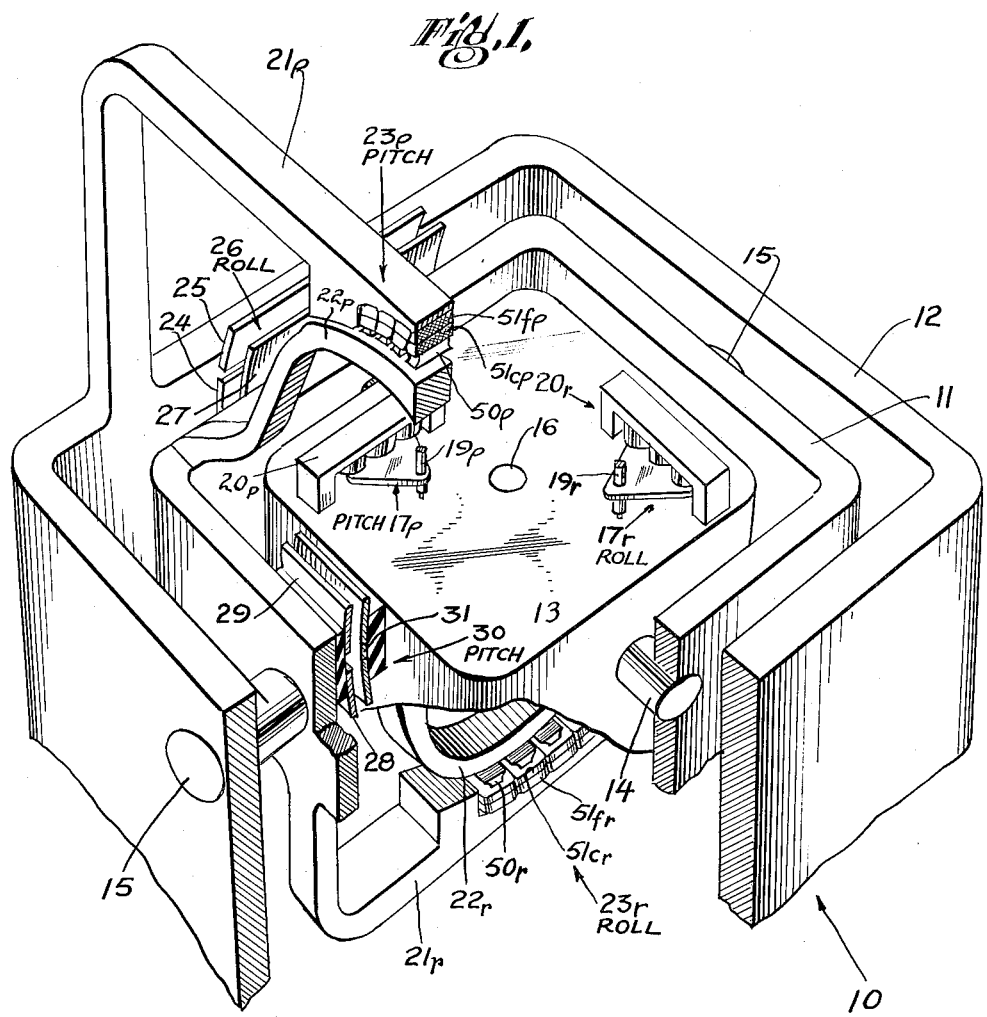
INVENTOR
Theodore W. Kenyon
BY
Kenyon + Kenyon
ATTORNEYS

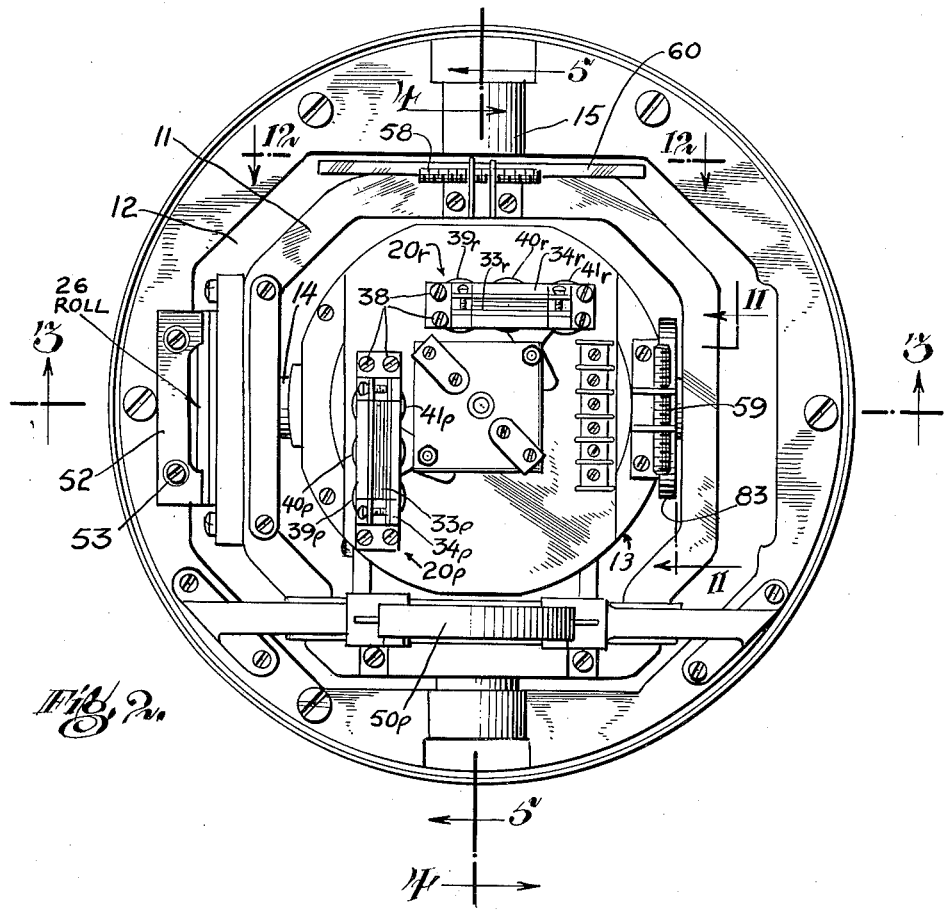
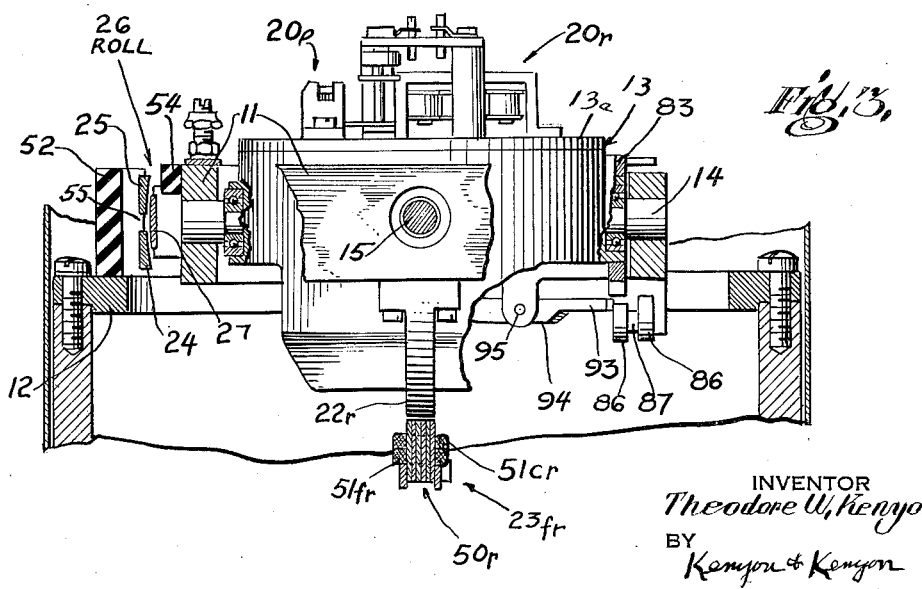

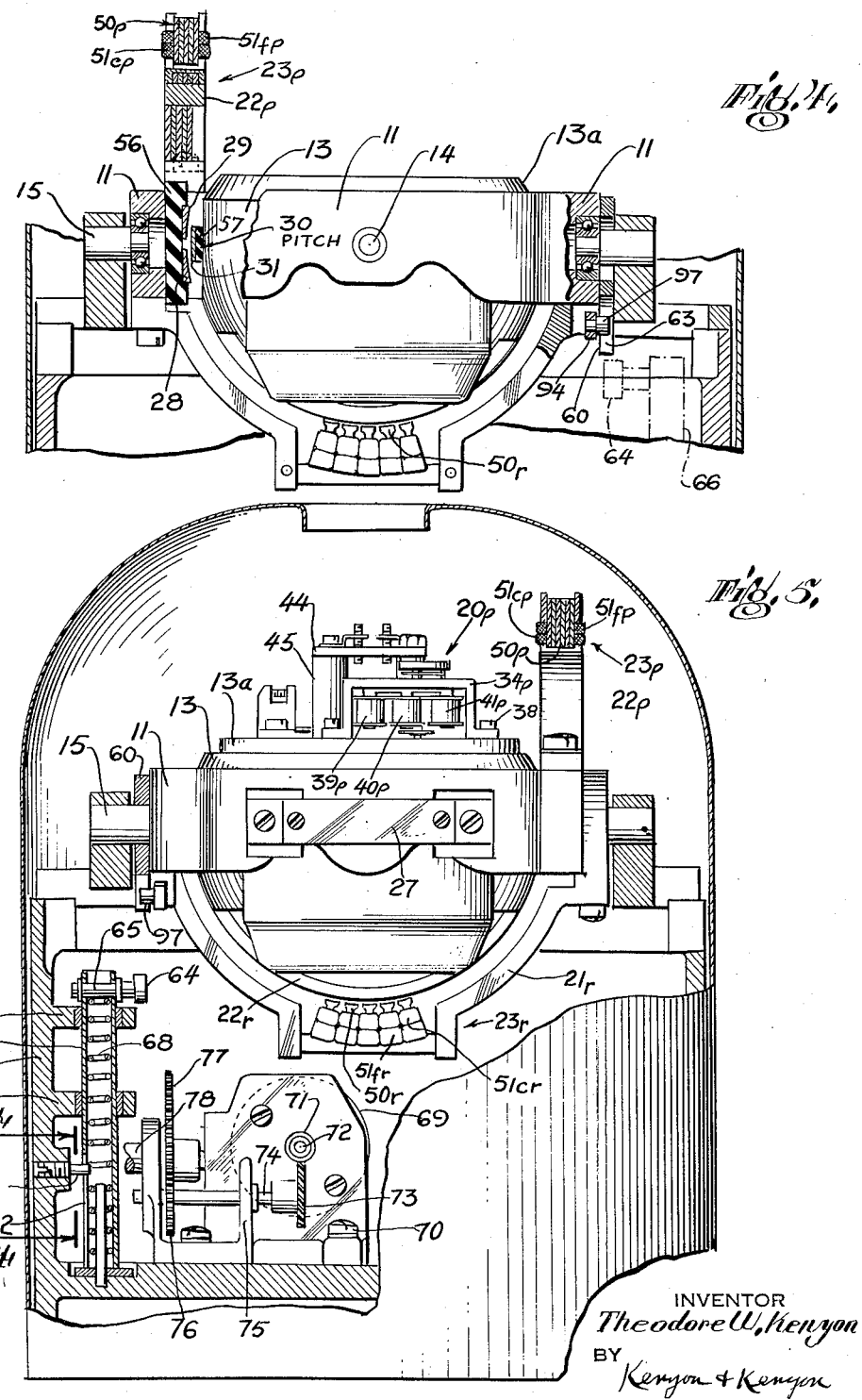

Dec. 26, 1961 T. W. KENYON 3,014,376
GYRO VERTICAL CONSTRUCTIONS
Filed Sept. 23, 1954 7 Sheets-Sheet 4

INVENTOR
Theodore W. Kenyon
BY
Kenyon & Kenyon
ATTORNEYS

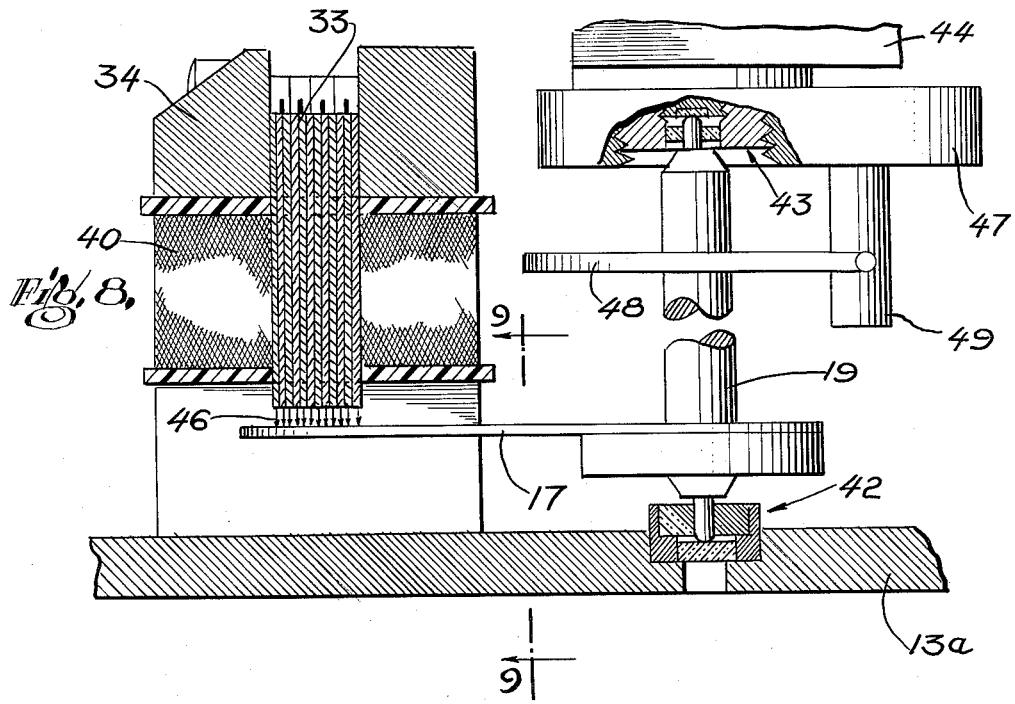
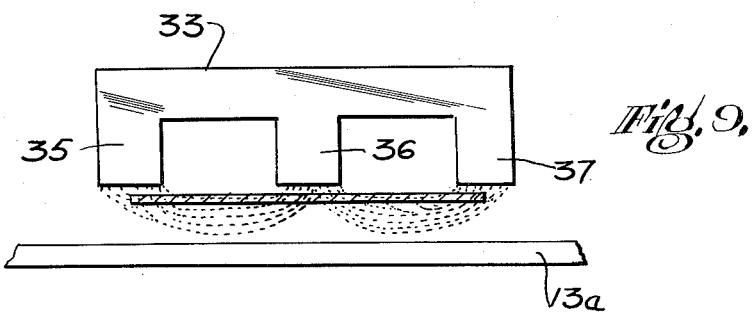
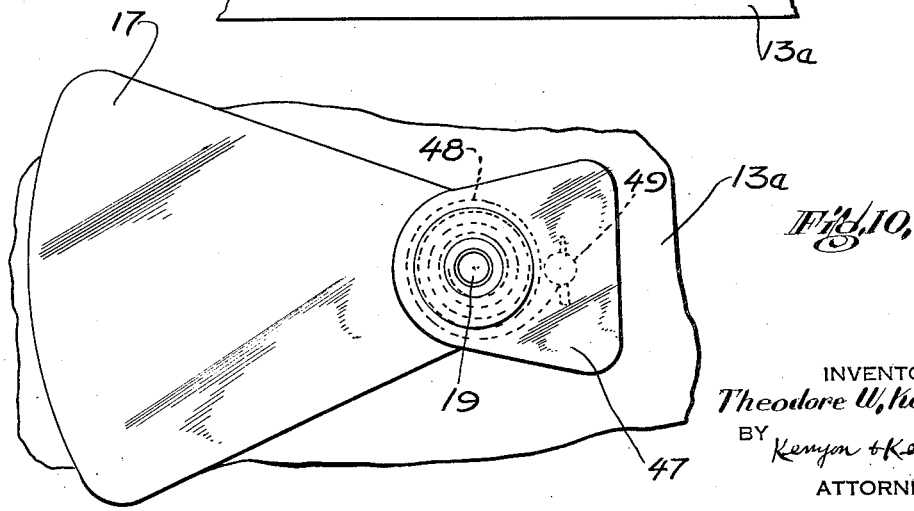

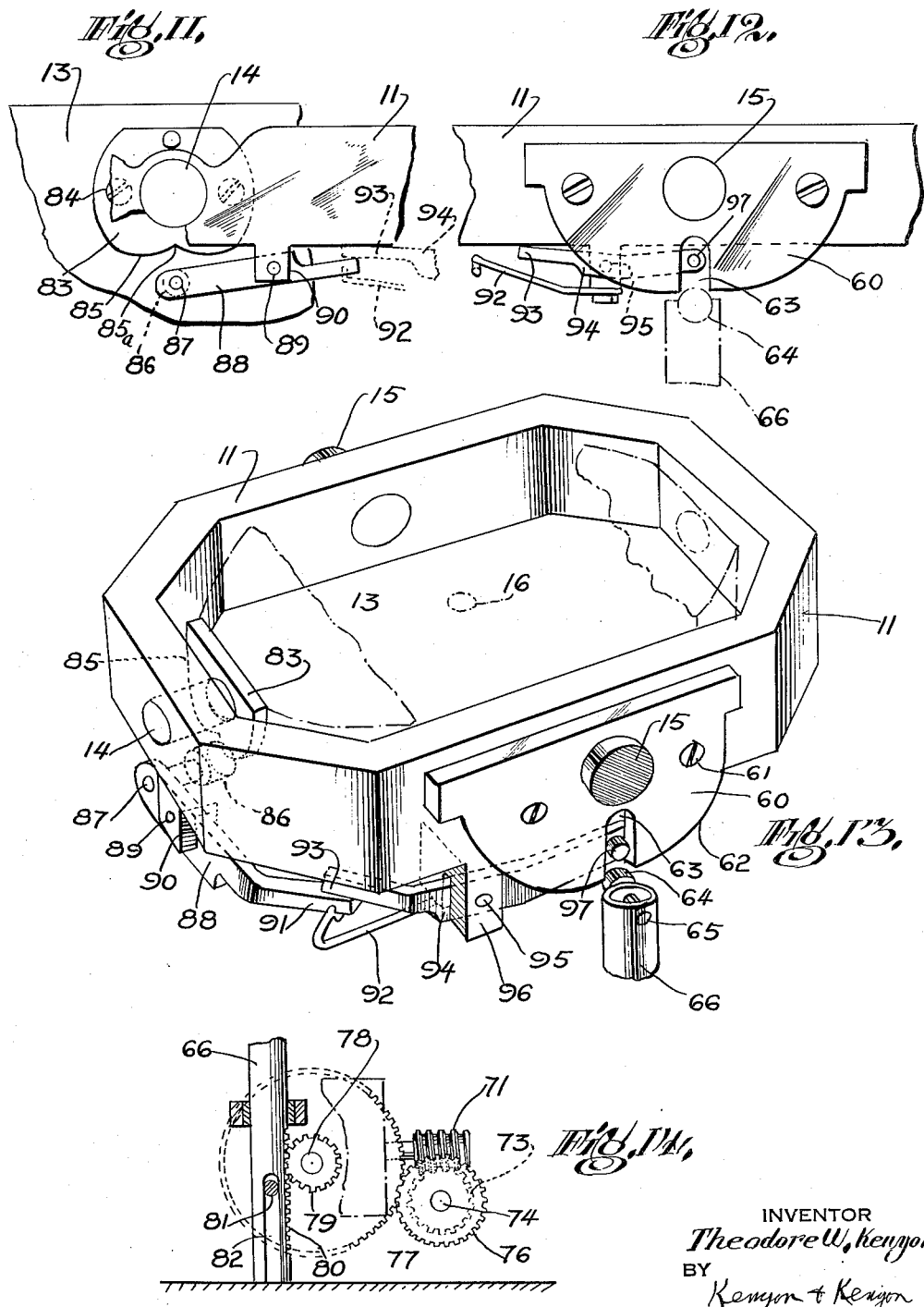

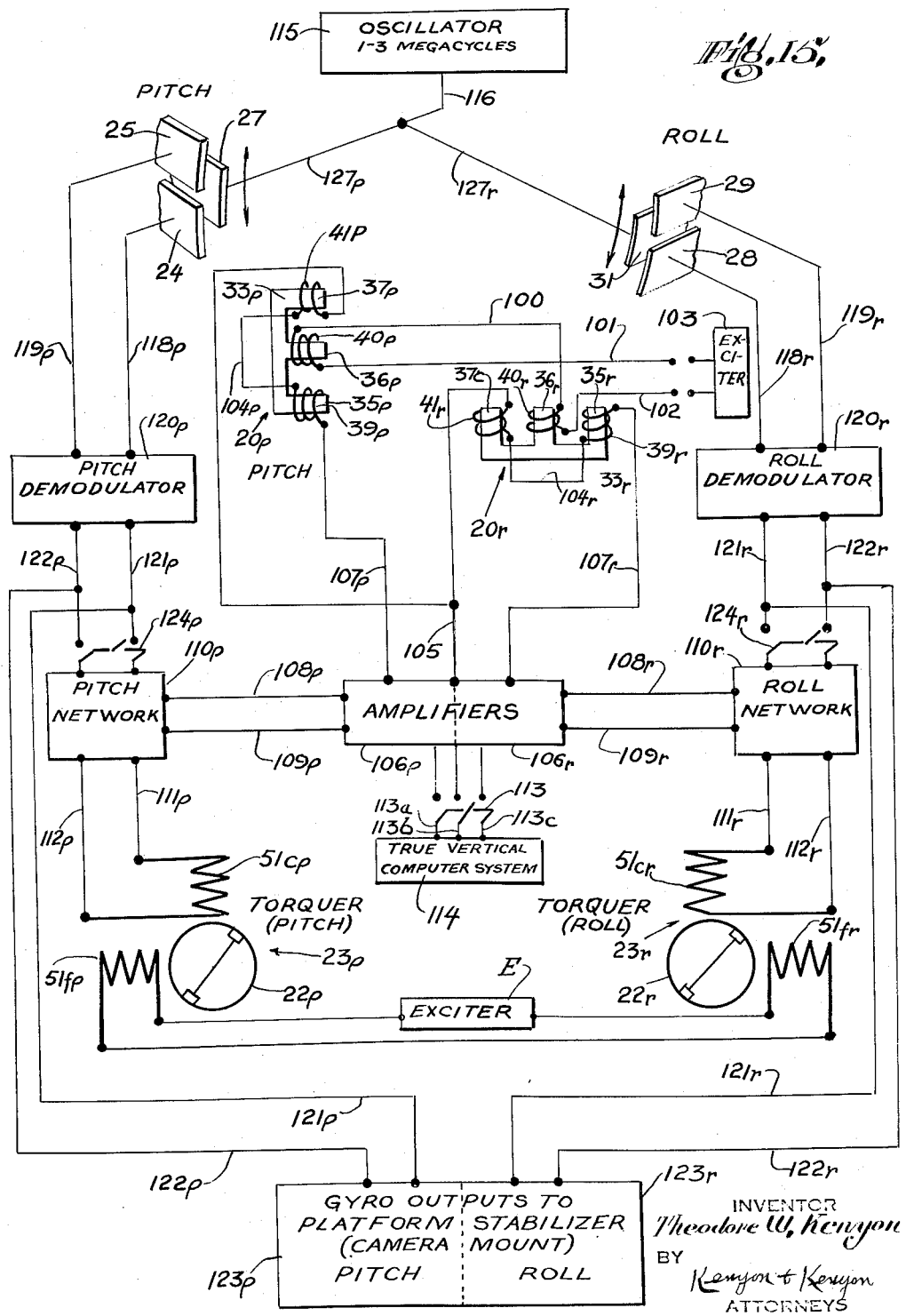

United States Patent Office 3,014,376
Patented Dec. 26, 1961

3,014,376
GYRO VERTICAL CONSTRUCTIONS
Theodore W. Kenyon, Old Lyme, Conn., assignor, by mesne assignments, to Aeroflex Laboratories Incorporated, a corporation of New York
Filed Sept. 23, 1954, Ser. No. 457,992
8 Claims. (Cl. 74—5.4)

The present invention relates to gyro vertical constructions intended primarily to stabilize the platforms of camera mounts utilized in aerial photography, or to provide for stability of other platforms or mounts.

It is conventional in such practice to utilize a gyroscopic vertical device for the purposes of stabilizing the platform, for example, of a camera mount. However, in the past the sensitivity of the gyro vertical has not been as good as proper aerial photography demands because of lack of sensitivity. This has in part been due to the use of inappropriate erector systems or to the use of erector systems that did not have the required sensitivity.

Objects and features of the present invention are the provision of a gyro vertical of the character described, with which an ultra sensitive gyro vertical of novel construction is incorporated.

Further objects and features of the invention are the provision of an erector system wherein the erector pendulums rotate freely on vertical shafts in relationship to E-type magnetic pick-off erector signal devices. The energizing coils for the pick-off devices are located above the movable pendulum armatures. The mechanical and magnetic systems as a result are such that practically all weight is off the bearings of the pendulums. In consequence, there is extremely low friction and extreme sensitivity.

Further objects and features of the invention are the provision of novel pendulum and armature design and hair spring restraint for the pendulums so that practically linear output may be obtained over any desired angular swing.

Further objects and features of the invention are the provision of a novel gyro output pick-off or signal-imparting system or arrangement embodying a high frequency capacitator arrangement whose output may be designed either to be linear with respect to angular deflection or any mathematical function desired.

Further objects and features of the invention are the provision of circuital arrangement whereby part of the gyro outputs may be combined with the erector signals to yield correct erection forces under dynamic conditions.

Further objects and features of the invention are the provision of an anti-nutation circuit arrangement which eliminates the hazard of having the entire system "take off" in a violent hunt. The anti-nutation arrangement provides for damping out of any tendency toward nutation before it starts. This results in a thoroughly smooth working system of a gyro and a servo motor combination with the result that a considerably higher frequency and more accurate servo system may be used with the gyro than in systems presently known.

Other objects and features of the invention are the provision of a novel caging arrangement that automatically provides successive rapid caging along one axis at a time, thus effecting quicker caging with less caging power.

Further objects and features of the invention are the provision of relatively simple mechanical structural and electrical arrangements for effecting the foregoing features.

Further objects and features of the invention will become apparent from the following specification and the accompanying drawings wherein:

FIG. 1 is a schematic showing of a gyro vertical embodying the novel erector and pick-off systems hereinbefore mentioned;

FIG. 2 is a plan view with the cover removed of a gyro vertical apparatus embodying the invention;

FIG. 3 is a fragmentary vertical section taken along line 3—3 of FIG. 2 and viewed in the direction of the arrows;

FIG. 4 is a similar section taken along line 4—4 of FIG. 2;

FIG. 5 is a vertical section at right angles to the section of FIG. 3 taken along line 5—5 of FIG. 2 and illustrating certain caging mechanism details;

FIG. 8 is an enlarged fragmentary elevational view of one of the pendulum mechanisms utilized in the erector system;

FIG. 9 is a view taken in the direction of the arrows 9—9 of FIG. 8;

FIG. 10 is a fragmentary plan view of FIG. 8;

FIG. 11 is a fragmentary elevational view of the caging and lever work for the inner gimbal frame of the gyro vertical;

FIG. 12 is a similar elevational view of the cam and lever work of the caging mechanism of the outer gimbal frame;

FIG. 13 is a perspective view showing the relationship of the cams and levers providing automatically successive actuation of the caging mechanisms of the two gimbals;

FIG. 14 is a fragmentary elevational view partially in section of the driving connections between the caging motor and the caging link work; and FIG. 15 is a diagrammatic or schematic view of electrical circuits involved.

Figure 6:
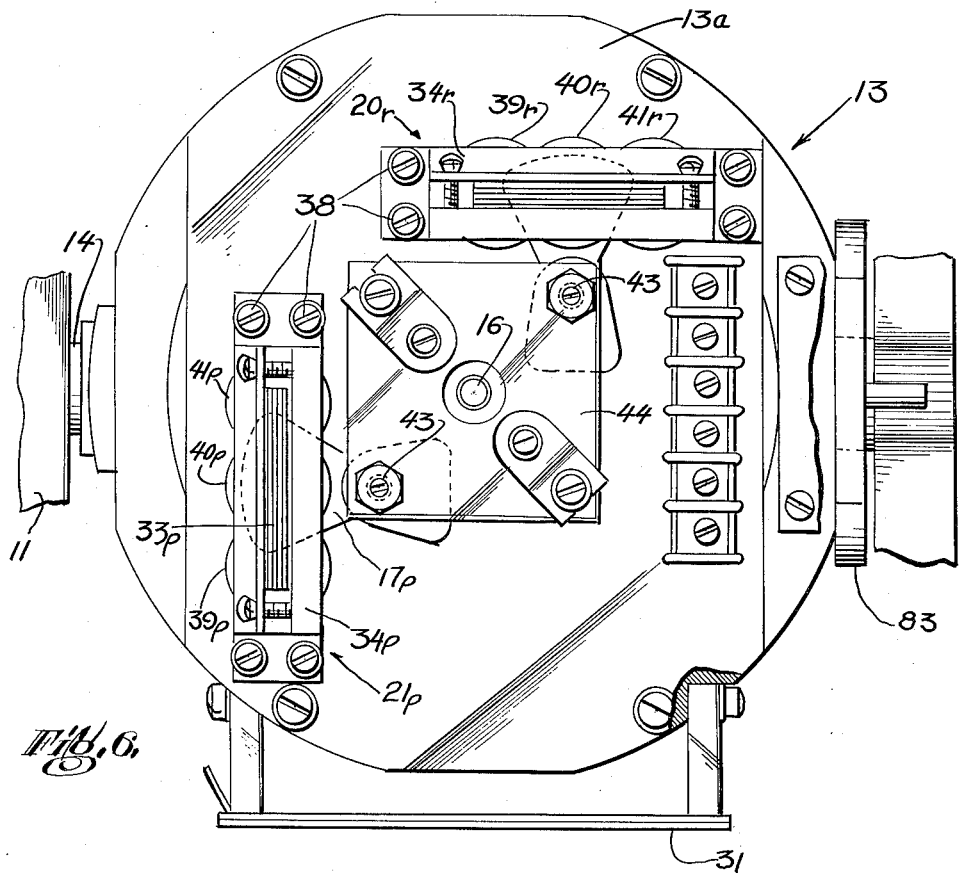
FIG. 6 is a plan view on an enlarged scale of elements appearing in FIG. 2.

Referring to the drawing and first to schematic FIG. 1, the reference character 10 denotes generally a gyro vertical arrangement. This arrangement includes an outer gimbal frame 11 and a support frame 12. The outer gimbal frame 11 supports the rotor carrying inner gimbal 13 of the gyro rotor (not shown), on the trunnions 14. The outer gimbal 11 in turn is carried from the support frame 12 by the trunnions 15 whose axis is perpendicular to the axis of the trunnion 14. The axes of the sets of trunnions 14 and 15 lie in a substantially horizontal plane, being mutually perpendicular, and the axis 16 of the gyro rotor (not shown) is normal or perpendicular to said plane. The rotor is driven in any suitable manner, for example, either by electrical or pneumatic power as is conventional.

*Erector system*

The erector system which is one of the features of the instant invention is appropriately supported or located, for example, on the upper cover plate 13a of the inner gimbal frame 13. This erector system comprises a pitch-responsive pendulum 17p and a roll-responsive pendulum 17r mounted, respectively, on vertical pintles or shafts 19p and 19r to swing freely in horizontal planes with respect to the E-type pick-offs 20p and 20r.

The gimbal frame 11 carries a pole piece supporting stator 21r which cooperates with a rotor segment 22r of a roll torquer 23r responsive to roll. Similarly the support frame 12 carries a pole piece supporting stator 21p which cooperates with the rotor segment 22p of a pitch torquer 23p. Erector energizing signal impulses for the pole pieces of the stators or respective torquers 23p and 23r are created by the swing of the respective pendulums 17p and 17r resulting from pitch or roll as the case may be. These impulses are created by variations in the magnetic fields provided at the respective E-type pick-offs 20r and 20p caused by pendulum swing. The impulses are appropriately amplified and transmitted through electrical circuits, as will be presently described, to energize the appropriate coils of pole pieces on the armatures of the respective torquers 20p and 20r, thereby imparting restoring or corrective torquing actions to the outer gimbal 11 and to the inner or gyro rotor-carrying gimbal frame 13, as the case may be, to restore and maintain the vertical disposition of the rotor axis 16.

*Gyro output signalling arrangement*

The outer support frame 12 is provided with a pair of insulatively-separated, parallelly-disposed arcuate condenser plates 24 and 25 of the gyro roll output condenser 26. A parallelly-disposed single condenser plate 27 also having arcuate shape is appropriately secured in insulative relationship to the gimbal frame 11 and in movable spaced relationship relative to the two plates 24 and 25. Movement of the plate 27 in response to swing or rotary roll shifts in position of the outer gimbal frame 11 on its trunnions 15 causes changes in electrical capacity of the condenser arrangements existing between the plates 24, 25 and 27, and causes appropriate electrical roll output signal pulses to be delivered in an electric circuit, to be presently described, connected to a servo system for appropriate corrective movement for roll of the camera mount platform (not shown) or the like. The similar arcuate condenser plates 28 and 29 of a pitch condenser 30 are mounted in spaced insulative relationship on the outer gimbal frame 11 and the single arcuate plate 31 carried by the inner gimbal or rotor frame 13 in parallel relationship to the plates 28 and 29 provides the corrective pitch electrical signal output pulses to the servo system for pitch departures from the vertical of the rotor axis 16 relative to the axis of the trunnions 14.

Briefly and schematically the operation of the gyro vertical system above described is as follows: Rotation or swing of the outer gimbal 11 and the inner gimbal frame 13 occurring about the respective roll and pitch trunnions 15 and 14 produces the following effects. If a pitch swing or variation only occurs, the pitch pendulum 17p swings on its pintle 19p relative to the E-type pick-off 20p and creates electrical erector impulses which are transmitted through an appropriate electrical circuit, to be presently described, to appropriate coils on the pole pieces of armature 21p of the pitch torquer 23p. The received impulses actuate the rotor 22p of the pitch torquer 23p in the direction of corrective rotation for the inner gimbal frame 13 about the pitch trunnions 14 to restore or maintain the vertical position of the rotor axis 16. Similarly, if a roll occurs, the roll pendulum 17r oscillates or swings about its vertical pintle or shaft 19r and produces electrical erector impulses in the E-type pick-off 20r which are transmitted through appropriate electric circuits, to be described, to appropriate coils on the pole pieces on armature 21r of the roll torquer 23r. These impulses correctively rotate the rotor 22r of said roll torquer 23r to maintain or restore the rotor axis shaft 16 to vertical. Should pitch and roll occur simultaneously, the two pendulums 17p and 17r would swing simultaneously and cause the required corrective erector rotational pulses to be transmitted simultaneously to the rotors of the respective torquers 23p and 23r.

Simultaneously with the swinging operations of the respective pendulums 17p and 17r, the movable pick-off plates 31 and 27 will move relative to their respective pairs of fixed plates 28, 29, 30 and 24, 25 causing capacitative changes in the respective condensers 30 and 26. These changes cause electrical gyro signal outputs that are used for operation or control of servo systems (not shown) in required manner to maintain the horizontal condition of a camera mount platform (not shown).

*The erector system details*

Referring now to FIGS. 2–7, inclusive, the pick-off mechanisms or arrangements 20p and 20r are identical in construction. Each consists of a substantially E-shaped laminated core 33 (FIGS. 8 and 9), for example, soft iron or other magnetic material. Each core 33 is supported in a frame 34 with the three parallel core legs 35, 36 and 37 extending perpendicularly and downwardly toward the upper surface 13a of the inner gimbal or rotor casing 13 but with their outer ends terminating at a selected level above said surface. Each of the frames 34 is secured to the casing surface as by the bolts 38 (FIG. 2). Electrical coils 39p, 40p and 41p are supported by the respective legs 35p, 36p and 37p of the E core 33p. Similar coils 39r, 40r and 41r are supported by the legs of E core 33r. The coils 40p and 40r on the center legs 36p and 36r are adapted, as will be described, to receive energizing current from an appropriate exciter source for the purposes of energizing the magnetic cores 33p and 33r and establishing electric fields extending from the legs 35p, 36p and 37p and 35r, 36r and 37r in which the fan-tail shaped portions of pendulums 17p or 17r, as the case may be, are swung when pitch or roll occurs.

Figure 7:
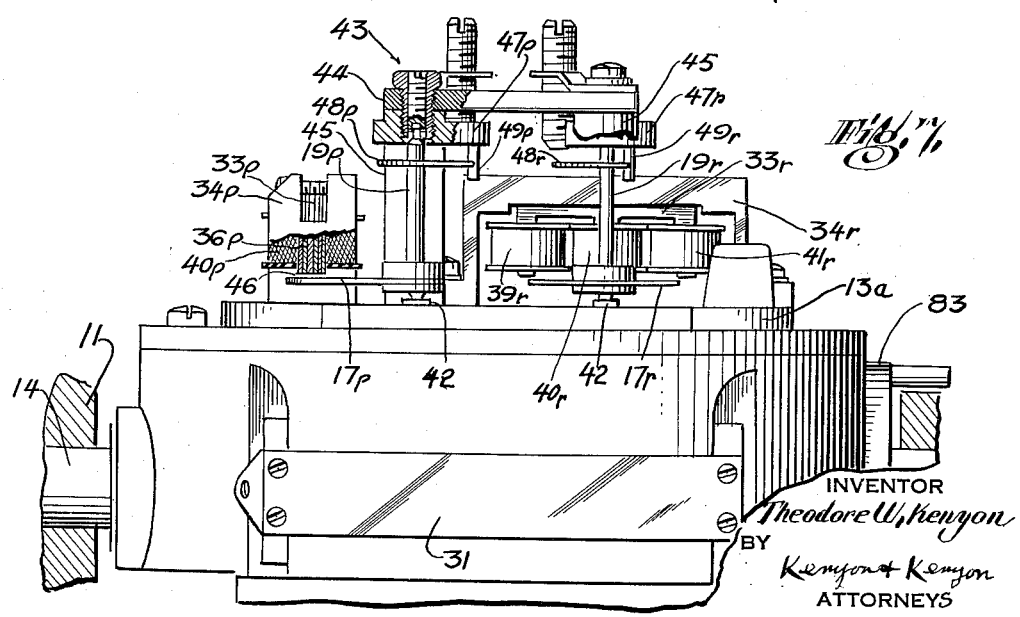
FIG. 7 is a front elevational view of the arrangement of FIG. 6.

Pendulums 17p and 17r are identical in structure and each has fan-like blade shape when viewed in plan. The pintle pins 19p or 19r which carry the horizontally-disposed pendulum blades 17p or 17r are supported vertically between the fixed double jewel bearing 42 mounted in the upper plate 13a of the frame 13 and the adjustable double jewel bearing 43. The bearing 43 is threadedly mounted in a plate-like member 44 (FIG. 7). This plate-like member 44 is supported by the posts 45 which extend from the upper plate surface 13a of the frame 13. The pendulums 17p and 17r each extend horizontally from the pintle posts 19p and 19r and under the outer ends of the core legs 35p, 36p and 37p and 35r, 36r and 37r. The upper surfaces of the pendulums lie below the lower ends of said core legs to provide an air gap 46 of desired dimensions.

Members 47p and 47r extend laterally relative to the pintle shaft 19p and 19r. Light helically coiled springs 48p and 48r whose inner ends are secured respectively to the pintles 19p and 19r and whose outer ends are secured respectively to fixed posts 49p and 49r extending from the members 47p and 47r, serve normally to bias the blade-like portions of the pendulums 17p and 17r into centralized positions belows the center legs 36p and 36r of the E cores 33p and 33r. At this time the distribution of magnetic fields under the core leg members is uniform. Any swing or shift of the blade-like member 17p or 17r either in clockwise or counterclockwise rotation on its pintle 19 or 19r changes the magnetic fields in the gaps 46p or 46r, as the case may be, and consequently induces electric currents of different magnitudes in the outer leg coils 39p, 41p and 39r, 41r. The induced currents resulting from swing of the pendulums serve, as will be presently described, respectively, to actuate the torquers 23p and/or 23r in appropriate restorative directions of rotation to re-balance the pendulums 17p or 17r, as the case may be.

It is to be noted from FIGS. 3, 7, 8 and 9 that the E-type erector cores 33p and 33r and the coils on their legs are all located above the blade-like pendulums or armatures 17p or 17r. The coils 40p and 40r on the center legs 36 of the said cores are intended to carry exciting currents for the cores through circuit connections presently to be described. The values of these exciting currents are so adjusted that virtually all of the weight is off the jewel bearings 42 and 43 which for practical purposes act merely as guides. This reduces friction between the pintles 19 and the bearings by a factor of approximately 10 and is of prime importance in securing the ultra sensitivity of the instrument of this invention.

A second and equally important part of the invention is that with this erector construction and by selection of the constants of the pendulum weights and tensions of the hair springs 48p and 48r the pendulums 17p and 17r move angularly much more than the inclination of its carrying pintle 19. (If there were no hair spring restraint, the pendulums would move "hard over" for any inclination of the pintles or gyro gimbals away from vertical.) With the constants used, however, with a 1° tilt of the gyro or pintle, approximately a 5° motion of the pendulum is obtained.

Due to this relatively large motion of each pendulum with a relatively small tilt of its supporting pintle, two very desirable things are achieved. First, there is a very high sensitivity (because friction has been so reduced by electro-magnetic floating of the pendulum as above described). Second, the pendulum moves sufficiently so that it may be shaped in a manner (fan-tailed, for example) so that the electrical output induced in the coils 39p, 41p and 39r, 41r on legs 35p, 37p and 35r, 37r is practically linear with respect to the angles of tilt of the pintles carried on the inner gimbal 13.

The importance and value of this linear output are that it may be, and is in many cases, combined with a signal from some true vertical computer system as will be described more in detail hereafter. With this combination of erector signals and true vertical computer signals the gyro will be erected to true vertical at all times and will not be affected by changes in apparent gravity due to horizontal accelerations of the vehicle (air or space) due to turns or to other accelerations.

If the erector output were not linear to a high degree of accuracy as is effected in the instant construction it would be impossible to accurately combine it with another signal (e.g. from a true vertical computer system) and obtain a true vertical erection of the gyro.

Torquers

The torquers 23p and 23r have substantially identical construction. Their stators 21p and 21r include, respectively, the salient field poles 50p and 50r which carry the respective fixed-phase field coils $51_{fp}$ and $51_{fr}$ which are energized by a determined fixed frequency from a conventional source. The respective poles also carry the respective control phase coils $51_{cp}$ and $51_{cr}$ which are designed to receive variable or control phase currents from the erector system. The field poles 50p of the stator 21p project toward the armature 22p of the torquer 23p. Likewise, the field poles 50r of the stator 21r project toward the rotor 22r of the torquer 23r. The supply of energizing current to the field coils 51p or 51r imparts appropriate rotational impulses to the respective armatures 22p or 22r, as the case may be.

The electric erector signal currents for energizing the field coils $51_{cp}$ and $51_{cr}$ are derived from the swinging movements of the pendulums 17p or 17r whenever unbalancing of either occurs.

The stator 21r of the roll torquer 23r is appropriately secured to the gimbal frame 11. Similarly, the stator 21p of the pitch torquer 23p is appropriately secured to the outer frame 12. The armature 22r of the roll torquer 23r is an arcuate segment secured appropriately to the inner gimbal and rotor housing 13 for movement in proximity to and under the influence of the field poles 50r. Similarly, the armature 22p of the pitch torquer 23p is an arcuate segment secured to the gimbal frame 11 for movement in proximity to and under the influence of the field poles 50p. The induced currents, hereinbefore mentioned, resulting from swinging displacements of the respective pendulums 17p or 17r, as the case may be, provide the erector signal currents for energizing the field coils 51p or 51r, as the case may be, of the respective torquers 23p or 23r.

The gyro output signal pick-off mechanism

The gyro output signal pick-off arrangements which are capacitative in nature are shown in section, respectively in FIGS. 3 and 4. These mechanisms serve to deliver output signalling currents to appropriate servo systems (not shown).

Thus, as seen in FIG. 3, the arcuate condenser plates 24 and 25 are supported in spaced parallel relationship relative to each other from an insulated block 52 which in turn is carried fixedly on the frame 12 as by bolts 53. The arcuate plate 27 is supported suitably on an insulative block 54 carried by the periphery of the gimbal frame 11 so that it extends in spaced parallelism with the two plates 24 and 25 and normally is centralized relative to the gap 55 between said two plates when frame 11 is horizontally disposed. Any clockwise or counterclockwise rotation of the gimbal 11 about its trunnions 15 will cause a corresponding shift of the plate 27 from its centralized position relative to said two plates 24 and 25, thus changing the capacitative relationship between these two plates 24 and 25 and the plate 27. Thereby a change in the circuit constants of electric circuits and in the output signalling currents leading to servo systems, as will be described, occurs for the purposes of energizing the latter. The plates 24, 25 and 27 provide a pick-off for output signal-imparting currents for effecting corrective movement of a servo system in response to roll of the gyro.

The spaced-apart plates 28 and 29 of the pitch pick-off capacitances as seen in FIG. 4, are supported in appropriate parallel spaced relationship from an insulated member 56 secured to the inner periphery of the outer gimbal frame 11. The movable plate 31 that operates in conjunction with the two plates 28 and 29 is secured on an insulative block 57 carried on the periphery of the inner gimbal or gyro rotor frame 13. The plate 31 normally is centralized relative to the plates 28 and 29 when frame 13 is horizontal for purposes similar to the centralization of plate 27 relative to plates 24 and 25. Changes of position of the plate 31 in response to rotary movement of the inner gimbal or rotor frame 13 on the trunnions 14 causes capacitative changes between plates 28, 29 and the plate 31 which change the circuit constants of an electric circuit to a pitch connecting servo mechanism for causing the latter to impart corrective movement for pitch to a camera platform mount. Plates 28, 29 and 31 thus provide a pitch gyro output signal current.

Gimbals 11 and 13 are provided with adjustable balancing weights 58 and 59 carried in threaded sockets for adjustment to balance the respective gimbals in horizontal positions on their trunnions.

The caging mechanism

The caging mechanism utilized for the gyro in the instant invention is controlled automatically and provides sequential caging first of the outer gimbal frame 11 and thereafter of the inner gimbal or gyro rotor frame 13. The purpose of sequential caging is two-fold in that speedier caging and less caging power are required.

In the embodiment shown, a cam 60 (FIGS. 12 and 13) is secured as by the bolts 61 to the periphery of the outer gimbal frame 11, being positioned adjacent to one of the trunnions 15. The cam generally has a curved outer periphery 62 that is symmetrical relative to a vertical center line and is provided at its mid-point with a radially directed normally vertical slot 63.

A freely rotatable (ball-bearing supported) roller 64 supported on a horizontally-disposed shaft 65 is carried by a vertically-disposed tubular member 66 (FIGS. 5, 13 and 14). This tubular member is guided in the bearings 67 (FIG. 5) extending laterally from a portion of the stationary frame 12. The bearings 67 guide the tube 66 vertically and permit its axial displacement.

An internally located biasing spring 68 is positioned below the shaft 65 and abuts a fixed part of the bottom of the frame 12. This spring 68 normally biases the tubular member 66 upwardly to maintain contact between the periphery of roller 64 and the peripheral surface 62 of the cam 60. This upward bias and the resulting pressure between the roller 64 and periphery 62 of the cam 60 serves to urge the gimbal frame 11 into a horizontal position at which time the roller 64 may enter into and move freely in the vertical slot 63. Once within said slot 63 the roller 64 locks or cages the outer gimbal 11 in a horizontal position on its trunnions 15. Uncaging can only occur by withdrawal of the roller 64 from the slot 63 against the biasing action of the spring 68. This withdrawal is effected by a downward axial movement of the tubular member 66 and such movement is effected in this embodiment by a fractional horsepower uncaging motor 69.

The motor 69 is supported suitably as by bolts 70 from a portion of the frame 12. A worm wheel 71 on the drive shaft 72 of the motor 69 meshes with a worm gear 73 carried on a horizontally-disposed shaft 74. This shaft 74 is supported by appropriate bearings 75 mounted on a portion of the frame 12. A gear 76 keyed to the shaft 74 meshes with a larger diametered gear 77 keyed to a horizontally-supported shaft 78. This shaft 78 in turn carries a pinion 79 (FIG. 14) which meshes with rack 80 provided on the surface of the tubular member 66. The arrangement is such that driven rotation of the drive shaft 72 of the motor 69 in one direction moves the tubular member 66 downward. Upon deenergization of motor 69, the spring 68 moves member 66 upwardly.

A guide pin 81 (FIG. 5) projecting laterally from the frame 12 into a longitudinally-disposed slot 82 (FIG. 14) in the surface of the tubular member 66 serves to prevent rotation of the tubular member 66 on its axis and thus prevents misalignment of the cam roller 64 and the peripheral surface 62 of the cam 60.

The caging mechanism for the inner gimbal frame 13 is interconnected with the outer frame caging mechanism above described so that the outer frame 11 will be either caged or uncaged in advance of the caging or uncaging of the inner gimbal frame 13. To this end a cam 83 (FIG. 11) is appropriately secured as by bolts 84 to a side wall of the inner gimbal or rotor frame 13 in proximity to one of the trunnions 14. This cam 83 has a cusp 85a in its arcuate surfaces 85 which is vertically aligned with the center of rotation about the trunnion 14.

A cam roller 86 rotatively disposed on a horizontally extending shaft 87 carried at one end of a lever 88 when in pressure engagement with the cam surface 85 serves to rotate the cam 83 and with it the inner gimbal frame 13 into a horizontal position on the trunnions 14.

The lever 88 is pivotally supported at 89 from a carrier 90 fixed to the outer gimbal frame 11. The end 91 of the lever 88 is biased in this embodiment in counterclockwise direction of rotation by a spring 92 secured to frame 11. The end 91 of the lever 88 in turn is also in sliding engagement with the end 93 of a lever 94. This lever 94 is pivoted at 95 in a support 96 depending from the outer gimbal frame 11. A pin 97 extends laterally from the lever 94 into the slot 63 of the cam 60. The width of slot 63 is sufficiently larger than the diameter of the pin 97 so as not to impede swing of the lever 94 about its pivot 95.

As long as the pin 97 is not engaged by the roller 64 in the slot 63, the action of biasing spring 92 imparts clockwise rotation to the lever 88 moving roller 86 away from contact with the cam surfaces 85 of cam 83. At the same time the spring 92 biases the lever 94 in a clockwise direction tending to urge the pin 97 toward the outer end of slot 63 so that the pin 97 may be engaged immediately by the roller 64 when the latter enters the slot 63.

Operation of the caging mechanisms just described is substantially as follows:

Assuming first a completely uncaged position of both gimbal frames, the tubular member 66 will be in a lowered or retracted position under power actuation of the motor 69 through the gears 73, 77, 79 and rack 80. At such time the roller 64 lies out of the slot 63 and out of contact with the periphery 62 of the cam 60. At the same time the roller 86 lies out of contact with the cam surfaces 85 of the cam 83 because of the biasing action of spring 92. At such time both gimbal frames may rotate freely on their respective trunnions 14 and 15 for general gyroscopic effects.

If for any reason caging is desired, the caging motor 69 is de-energized. This permits the biasing spring 68 within the hollow post 66 to move the latter upwardly and thereby to bring the cam roller 64 into contact with the peripheral surface 62 of the cam 60. The upward force exerted by the spring 68 is transmitted through the roller 64 to the cam surface 62, tending to rotate the latter and with it the outer gimbal frame 11 about the trunnions 15 into a horizontal position at which time the slot 63 of the cam 60 becomes vertically aligned with the cam roller 64. The latter at this instance then enters the slot 63 and locks or cages the outer gimbal 11 against further rotation on the trunnion 15.

At the same time the roller 64 is free to continue moving upwardly in the slot 63 under action of spring 68 on shaft 66. In such movement the roller 64 engages the pin 97 and moves it upwardly thus rotating the lever 94 counterclockwise against the biasing action of the weaker spring 92. The end 93 of the lever 94 acting against the end 91 of the lever 88 rotates the latter clockwise and brings its cam roller 86 into engagement with the curved cam surfaces 85 of the cam 83. This engagement causes the cam 83 and with it the inner gimbal frame 13 to be rotated about the trunnions 14 until the roller 86 lies centered within the cusp 85a. When such centering occurs, the inner gimbal frame 13 lies horizontally disposed and is caged or locked against further rotation by the intimate engagement between roller 86 and the walls defining the cusp 85a.

It is seen, therefore, that sequential caging occurs when the caging motor 69 is stopped, the sequence being first a caging of the outer gimbal frame 11 and then a caging of the inner gimbal frame 13. Uncaging which occurs upon starting of the motor 69 is in reverse sequence. The downward withdrawal or movement of the tubular member 66 under action of the running motor 69 through the gear train and rack first separates the roller 64 and pin 97 before the roller 64 leaves the slot 63. In consequence, the cam roller 86 under action of the spring 92 moves out of the cusp 85a and uncages or unlocks the inner gimbal frame 13. Further downward movement of the tubular member 66 under action of the running motor 69 withdraws the roller 64 from the slot 63 and thus then uncages the outer gimbal frame 11.

While the caging in the embodiment described is effected by stopping of the motor 69 and uncaging is effected by running the motor 69, it is obvious that the sequence of operations may be reversed.

*Electrical circuits*

The electrical circuits incidental to the operation of the gyro vertical to provide energizing current for rotating the gyro rotor, for energizing the torquers and for energizing the E-shaped cores of the erector take-offs and for removing the gyro signal outputs of the capacitative pick-offs for stabilization, are arranged in as compact and convenient a manner as possible, suitable arrangements on parts of the apparatus of the instant invention being provided for providing pivotal junctions where necessary to complete the electrical circuits to moving parts. A schematic diagram of the eletrical circuits involved except those for driving the rotor and the caging motor which are conventional, is shown in FIG. 15.

As seen in FIG. 15, the center leg coils $40p$ and $40r$ of the respective E-type erector signal pick-off mechanisms $20p$ and $20r$ are connected in electrical series by a wire 100 and by the wires 101 and 102 to a conventional 400 cycle A.C. exciter 103. The outer leg coils $39p$ and $41p$ of the pitch pick-off mechanism $20p$ are connected in series by a wire $104p$. Similarly, the outer leg coils $39r$ and $41r$ of the roll pick-off mechanism $20r$ are connected in series by a wire $104r$. Coils $41p$ and $41r$ are both connected to a common wire 105 leading to the vacuum tube amplifiers $106p$ and $106r$. These amplifiers preferably are 400 cycle A.C. amplifiers, but other frequencies may be used. The coil $39p$ is connected to an input lead $107p$ of the amplifier $106p$. Likewise, the coil $39r$ is connected to another input lead $107r$ of the amplifier $106r$.

The amplifiers $106p$ and $106r$ have the independent sets of output leads $108p$, $109p$ and $108r$, $109r$. These lead respectively to the independent pitch network $110p$ and the independent roll network $110r$. These two networks are described more in detail hereinafter.

Displacements of the respective pitch and roll pendulums $17p$ and $17r$ on their pinties $19p$ and $19r$ (FIG. 1) to the right or to the left of their centralized position under the respective center core legs of the cores $36p$ or $36r$ determine the magnitudes and directions of the pitch and roll erector signal pulses delivered to the respective amplifiers $106p$ and $106r$, as the case may be, by the respective pairs of wires $107p$ and 105 or $107r$ and 105. The pitch erector signal pulses reaching the amplifier $106p$ are amplified thereby and delivered via the output wires $108p$, $109p$ to the pitch network $110p$. Similarly, the roll erector signal pulses reaching the amplifier $106r$ are amplified thereby and delivered via output wires $108r$, $109r$ to the roll network $110r$.

The fixed-phase field coils $51_{fp}$ and $51_{fr}$ are connected in series and to a conventional exciter E similar to the exciter 103. The pitch network $110p$ selects properly phased current components of the amplified pitch erector signal pulses reaching it and delivers such components via wires $111p$, $112p$ to the pitch torquer field coils $51_{cp}$. Similarly, the roll network $110r$ selects properly phase current components of the amplified roll erector signal pulses reaching it and delivers such components via wires $111r$, $112r$ to the roll torquer field coils $51_{cr}$. The energization of these field coils $51_{cp}$ or $51_{cr}$ in this manner reacts with the fixed-phase fields in coils $51_{fp}$ or $51_{fr}$, as the case may be, and imparts corrective erector movements to the respective torquer armatures $22p$ or $22r$, as the case may be, and consequent restorative movements of the inner gimbal frame 13 and the outer gimbal frame 11 to their horizontal conditions. This results in restoration of the gyro rotor axis 16 to its vertical position. It is to be noted that toquers function at 90° to the torque applied. Thus, in operation, the signal from the erector pick-off $20r$ caused by movement of pedulum $17r$ is fed to the torquer $21r$. The effect of this torquer being at 90° will then erect the gyro about its roll axis. The same factors are true as regards erection about the pitch axis wherein the torquer $21p$ functions in response to signals carried by the pendulum $17p$.

The amplifiers $106p$ and $106r$ are also connectable through wires $113a$, $113b$, $113c$ and a switch 113 with a true vertical computer system 114 of known type. When switch 113 is closed, true vertical signals from the computer system are fed to the amplifiers $106p$ and $106r$ for combination there with erector signals delivered to these amplifiers from the pitch and roll erectors $20p$ and $20r$ to insure erection to true vertical at all times.

Since the pendulums $17p$ and $17r$ float with little apparent weight under the excited core legs $36p$ and $36r$ of their erector cores $33p$ and $33r$ with utmost reduction in friction and the outputs induced in the outer leg coils are linear, as has been hereinbefore described, it is possible to combine the erector output signals with the true vertical computer signals in the amplifiers to achieve true vertical of the gyro.

The gyro output signals from the gyro vertical which are delivered as outputs therefrom for operating servo systems (not shown) of a platform stabilizer or the like (not shown) namely, the servo signal outputs of the gyro vertical, are derived as follows:

An oscillator 115 of conventional type designed to deliver a fixed selected frequency output of constant selected magnitude having, for example, a frequency of 1–3 megacycles at 150 to 200 volts, has its output lead 116 connected, respectively, by the wires $127p$ and $127r$ to the centralized condenser plates 27 and 31. These two plates, as have been described heretofore, are the movable elements attached, respectively, to the outer and inner gimbal frames 11 and 13. The condenser plates 24 and 25 that are associated with the movable plate 27 are connected by the wires $118p$ and $119p$ to the input side of a pitch demodulator $120p$. Similarly, the plates 28 and 29 associated with the movable plate 31 are connected, respectively, by the wires $118r$ and $119r$ to the roll demodulator $120r$.

The D.C. pitch signal output of the pitch demodulator $120p$ is connected by the wires $121p$ and $122p$ to the input of a pitch platform stabilizer servo system $123p$. Similarly, the D.C. roll signal output of the roll demodulator $120r$ is connected respectively, by the wires $121r$ and $122r$ to the input of a roll platform stabilizer servo system $123r$.

Operation of the circuit components just described is substantially as follows:

When the gimbals 11 and 13 are horizontal respective condenser plates 27 and 31 are centralized relative to their pairs of stationary plates 24 and 28, 29. The oscillator output which then is transmitted to the respective pitch and roll demodulators $120p$ and $120r$, has a uniform value in wires $118p$, $119p$ and $118r$, $119r$ so that the outputs of the respective demodulators $120p$ and $120r$ delivered to the pairs of wires $121p$, $122p$ and $121r$ and $122r$ are balanced and do not actuate the servo systems $123p$ or $123r$. Any shift now, for example, of the centralized pitch condenser plate 27 relative to the plates 24 and 25 as a result of a pitch shift of the inner gimbal 13 on its trunnions 15 causes a consequent capacitative change between the plate 27 and the respective plates 24 and 25. In consequence, the currents transmitted to the demodulator $120p$ by the wires $118p$ and $119p$ are of different magnitudes. The demodulated signal current outputs of the demodulator $120p$ delivered via the wires $121p$ and $122p$ likewise have different magnitudes. In consequence, the servo system $123p$ receives gyro pitch output signals of different magnitudes via the latter pair of wires $121p$, $122p$ which cause corrective servo system actions in appropriate direction for the platform of the camera mount (not shown). Similar shift of the roll plate 31 relative to the plates 28 and 29 caused by a roll swing of the outer gimbal 11 on its trunnions 15 causes capacitative changes and therefore currents of different magnitude in the wires $118r$ and $119r$ to be delivered to the rolled demodulator $120r$. The demodulator roll signal output yields currents of different magnitudes in the wires $121r$ and $122r$ which are delivered to the roll servo system $123r$ and causes proper corrective action in appropriate directions for the platform of the camera mount to compensate for roll.

If desired, the output wires $121r$ and $122p$ may be connected through the switch $124p$ to the pitch network $110p$. Similarly the output wires $121r$ and $122r$ may be connected through the switch $124r$ to the input of the roll network $110r$. When normally open switches $124p$ and $124r$ are closed parts of the respective demodulator outputs are combined in the respective networks $110p$ and $110r$ with the outputs of the respective amplifiers $106p$ and $106r$ for the purposes of applying a damping to any nutation should it develop. In such case, if nutation develops, an opposite torquer signal is applied to the correct gimbal to damp out any tendency toward nutation. Such application would be very difficult with the usual 400 cycle A.C. output of gyro systems, but is relatively easy with D.C. gyro signal output developed with the arrangement of this invention.

The two demodulators 120p and 120r may be of vacuum tube or transistor types. Similarly, the amplifiers 106p and 106r may be of vacuum tube or transistor types. The respective networks 110p and 110r may be of any conventional type intended to select desired direct current components from the amplifier outputs for delivery to the field coils 51p or 51r of the respective torquers 23p or 23r.

The oscillator 115 is of any conventional type designed to yield an output of selected frequency and desired voltage. The specific circuits of the oscillator, the demodulators, the amplifiers, the true vertical system and the networks in themselves are not per se features of the instant invention and are conventional.

While specific embodiments of the invention have been described, variations within the scope of the appended claims are possible and are contemplated. There is no intention therefore, of limitation to the exact details shown and described.

What is claimed is:

1. A gyro vertical arrangement comprising a rotor gimbal frame and a second gimbal frame supported for rotation relative to each other about mutually perpendicular axes, a gyro rotor carried by the rotor axis gimbal frame for rotation normally about a vertical axis, erector pendulums carried by the rotor gimbal frame and swingable in substantially horizontal planes on departures of the gyro rotor axis from its vertical condition, electromagnetic erector signal pick-off means for each pendulum, capacitative gyro output signal pick-off means whose capacitances are variable in response to departures from determined dispositions of the respective frames, torquer means for each frame, electric circuits connecting the erector signal pick-off means with respective torquer means for delivering the erector signals generated in said erector signal pick-off means to energize the respective torquer means, electric circuits including networks for delivering network selected gyro output signals resulting from nutation and as generated by the capacitative gyro output signal means to the torquer means for action therein in conjunction with the erector signals, electrical platform stabilizer means and electrical circuits connecting the capacitative gyro output signals to said stabilizer means for stabilizing a platform.

2. The arrangement of claim 1 wherein the erector signal pick-off means each includes an E-type core and wherein each pendulum is swingable from a centralized position relative to the core to generate electric erector signals.

3. The arrangement of claim 1 wherein the capacitative gyro output signal means each include a pair of spaced rigidly-supported condenser plates and a movable condenser plate in proximity to said pair of plates, each movable condenser plate normally being disposed in a centralized position relative to its proximate pair of condenser plates.

4. The arrangement of claim 1 wherein the second named circuits include a common fixed frequency oscillator connected to each capacitative gyro output signal means and a separate demodulator connected to each of said capacitative gyro signal output means.

5. A gyro vertical arrangement comprising a rotor gimbal frame and a second gimbal frame supported for rotation relative to each other about mutually perpendicular axes, a gyro rotor carried by the rotor gimbal frame for rotation normally about a vertical axis, erector pendulums carried by the rotor gimbal frame and respectively displaceable in substantially horizontal planes by departures from vertical of the gyro rotor axis, E-type electromagnetic erector signal pick-off means for each pendulum, capacitative gyro output signal pick-off means whose respective capacitances vary in response to departures from determined dispositions of the respective frames, torquer means for each frame, electric circuits connecting the torquer means with respective of the E-type pick-off means for energizing the torquer means to restore the gyro axis to its vertical condition, electric circuits including networks connected to said capacitative pick-offs for delivering nutation generated, network selected portions of output signals therefrom to the torquer means for action in conjunction with the energizing action of the torquer means derived from the E-type pick-off means, platform stabilizer means and electric circuits connecting said capacitative pick-off means and said last-named means for providing stabilization action to a platform in response to signals from said capacitative pick-off means.

6. A gyro vertical arrangement comprising a rotor gimbal frame and a second gimbal frame supported for rotation relative to each other about mutually perpendicular axes, a gyro rotor carried by the rotor gimbal frame for rotation normally about a vertical axis, erector pendulums carried on the rotor gimbal frame and displaceable respectively by movements of different ones of the frames about their respective axes, electromagnetic erector signal output means for each of the pendulums, torquer means connected to the respective erector signal output means for imparting restorative erector movements to the respective frames in response to signals from the appropriate erector signal output means, capacitative gyro output pick-off means whose capacitative constants vary on departures from determined dispositions of the respective frames, servo systems for stabilizing a platform and electrical circuits including networks connected to said capacitative gyro output pick-off means for delivering gyro output signals therefrom to said servo systems to provide stabilizing action to the platform from said gyro vertical arrangement, and means for delivering network selected, nutation generated gyro output signals from said gyro vertical arrangement via the networks to the torquer means in conjunction with the erector signal output means to provide effective erector forces under dynamic conditions and to prevent nutation.

7. A gyro vertical arrangement comprising erector signal pick-off means, said means including a pintle, supports for rotatably carrying the pintle in normally vertical disposition, a fan-like armature pendulum extending laterally from the pintle and swingable with the pintle on the supports in a plane perpendicular to the axis of said pintle, a substantially E-shaped magnetizable core supported above said pendulum with its legs extending downwardly into proximity with the surface of said pendulum and substantially perpendicular to said surface, means for energizing said core to provide a magnetic field whose attractive force on said armature is sufficient to remove substantially all the weight of said pendulum and its pintle from said supports, and spring means for normally centralizing said pendulum relative to the legs of said core.

8. A gyro vertical arrangement comprising erector signal pick-off means, said means including a pintle, jewel support means for carrying the pintle in normally vertical disposition, a fan-like armature pendulum extending laterally from the pintle, a substantially E-shaped magnetizable core supported above said pendulum with its legs extending downwardly into proximity with said pendulum and substantially perpendicular to its surface, means for energizing said core with a current of selected fixed frequency and magnitude to provide a field whose magnetic attractive effect on said armature pendulum serves to attract it toward said core with a force sufficient to remove substantially all the weight of said pendulum and its pintle from said jewel support means, and spring restraint means for said pintle and pendulum serving normally to centralize said pendulum relative to the legs of said core.

(References on following page)

References Cited in the file of this patent

UNITED STATES PATENTS

| | | |
|---|---|---|
| 2,242,253 | Lyman | May 20, 1941 |
| 2,315,167 | Manteuffel et al. | Mar. 30, 1943 |
| 2,464,516 | Kenyon | Mar. 15, 1949 |
| 2,492,244 | Shivers | Dec. 27, 1949 |
| 2,501,885 | Barnes et al. | Mar. 28, 1950 |
| 2,513,738 | Noxon | July 4, 1950 |
| 2,580,748 | Fillebrown | Jan. 1, 1952 |
| 2,589,874 | Seliger | Mar. 18, 1952 |
| 2,597,151 | Konet | May 20, 1952 |
| 2,598,672 | Braddon et al. | June 3, 1952 |
| 2,606,310 | Baker | Aug. 5, 1952 |
| 2,620,669 | Braddon | Dec. 9, 1952 |
| 2,752,792 | Draper | July 3, 1956 |